United States Patent [19]
von der Embse

[11] Patent Number: 4,789,948
[45] Date of Patent: Dec. 6, 1988

[54] METHOD AND APPARATUS FOR DETERMINING COMMUNICATIONS LINK QUALITY AND RECEIVER TRACKING PERFORMANCE

[75] Inventor: U. A. von der Embse, Los Angeles, Calif.

[73] Assignee: Hughes Aircraft Company, Los Angeles, Calif.

[21] Appl. No.: 775,856

[22] Filed: Sep. 13, 1985

[51] Int. Cl.$^4$ .................. G06F 15/31; H04B 1/06
[52] U.S. Cl. .................. 364/514; 364/487; 371/22; 375/81
[58] Field of Search .............. 364/483, 484, 485, 487, 364/514; 371/22; 375/10, 81, 120; 455/67; 329/122

[56] References Cited

U.S. PATENT DOCUMENTS

| | | | |
|---|---|---|---|
| 3,621,388 | 11/1971 | Davis | 364/487 |
| 3,725,690 | 4/1973 | Hjorth | 364/485 |
| 3,937,899 | 2/1976 | Denenberg | 364/485 |
| 4,100,499 | 7/1978 | Monrolin | 375/81 |
| 4,259,740 | 3/1981 | Snell et al. | 375/120 |
| 4,507,740 | 3/1985 | Star et al. | 364/487 |
| 4,627,079 | 12/1986 | von der Embse | 364/485 |
| 4,635,260 | 1/1987 | Sestan | 371/22 |
| 4,654,864 | 3/1987 | Ichiyoshi | 375/81 |

OTHER PUBLICATIONS

Gardner, Floyd M., *Phaselock Techniques*, 1979, Wiley and Sons, Inc.

Primary Examiner—Parshotam S. Lall
Assistant Examiner—Daniel W. Juffernbruch
Attorney, Agent, or Firm—S. M. Mitchell; M. J. Meltzer; A. W. Karambelas

[57] ABSTRACT

Apparatus is disclosed for measuring a receiver measurement data set, and a digital processor adapted to determine a derived data set indicative of the communications link quality and dynamic receiver performance, utilizing powerful data reduction algorithms. The invention allows the monitoring of the quality and performance of remote communications links employing a communications receiver, determining the input signal amplitude and noise level, the carrier power to noise power density, the receiver tracking loop phase bias and 1-sigma jitter.

34 Claims, 6 Drawing Sheets

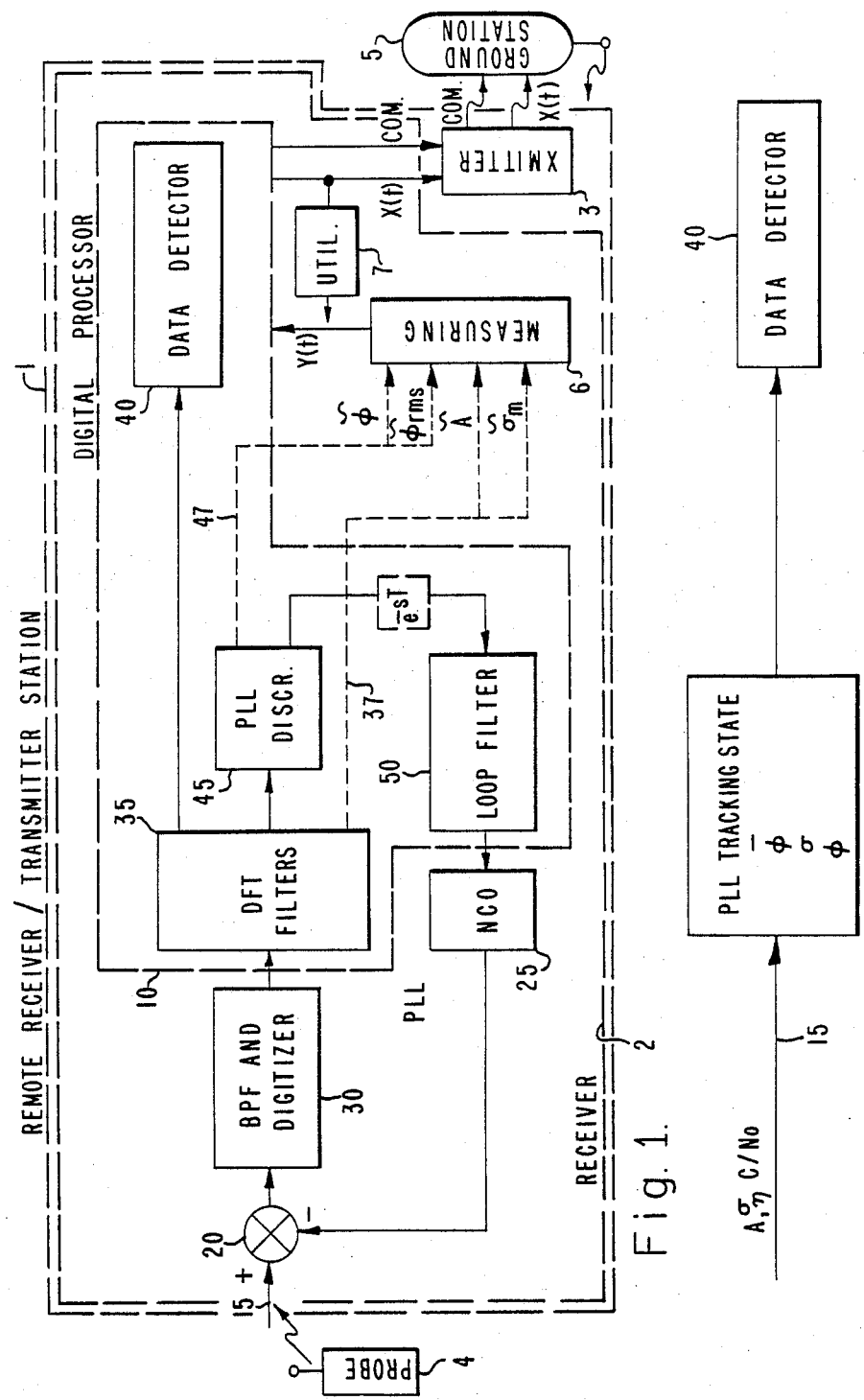

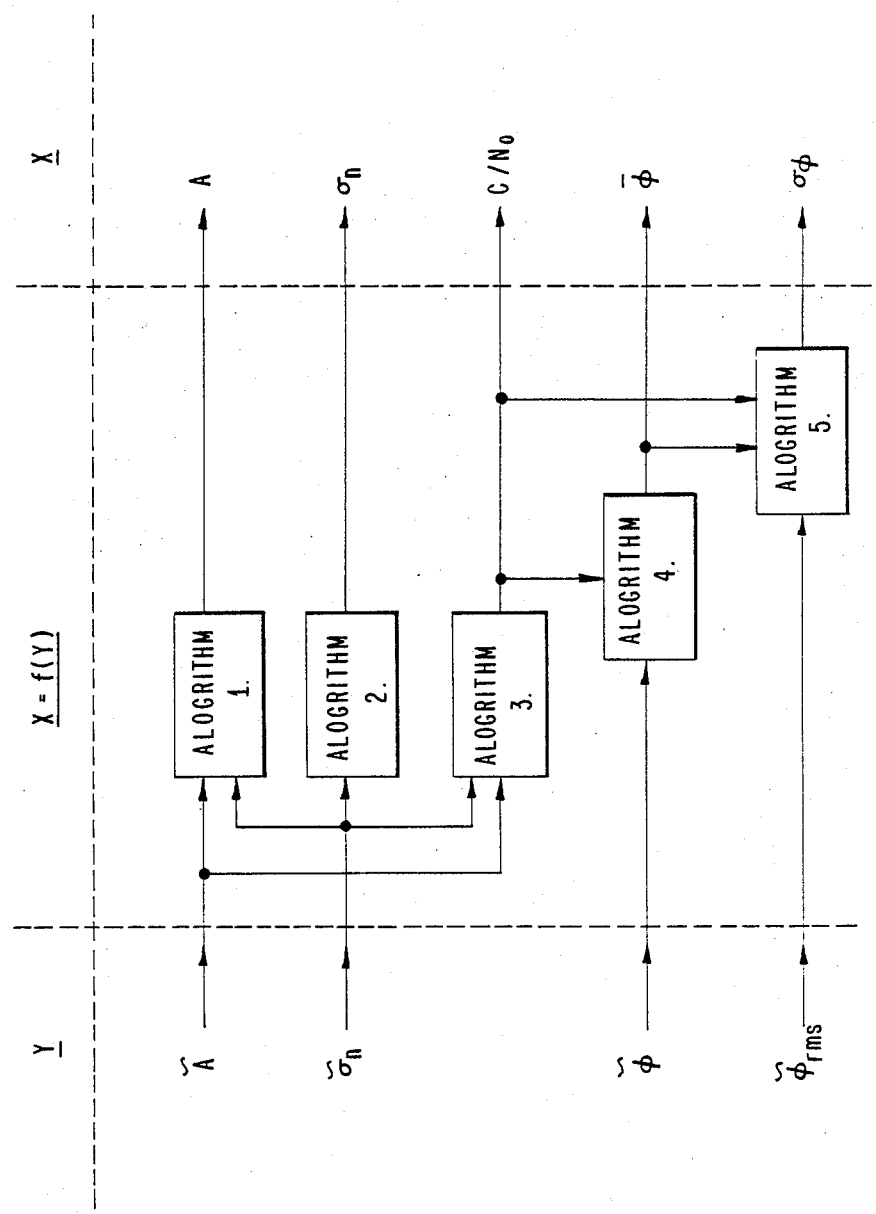

METHOD AND APPARATUS FOR DETERMINING COMMUNICATIONS LINK QUALITY AND RECEIVER TRACKING PERFORMANCE

BACKGROUND OF THE INVENTION

1. Field of the Invention

The field of the present invention is the monitoring of communications link quality and performance.

2. Description of the Invention

Data communications links are sometimes required to operate reliably in remote highly stressed environments, such as, for example, space vehicles and deployable probes employed in planetary exploration missions, communications satellites and other space vehicles providing communications links to ground stations and the like. The link may be disturbed by such phenomena as amplitude and phase scintillation, atmospheric absorption, wind gusts and turbulence, probe or spacecraft gain, oscillator drift, Doppler effect, and Doppler rate and noise variations.

For relay repeaters located at remote locations, which receive, demodulate and then retransmit signals to another communications station, there is typically no opportunity to directly measure parameters indicative of the quality of the received signal and the repeater receiver performance, as there would be if the communications link and receiver were accessible for direct measurements, e.g., in a laboratory setting.

Such remote receiver equipment may typically employ feedback loop operation to acquire, track and demodulate the incoming frequency or phase modulated data signal. The demodulated data is then modulated onto a transmit carrier transmission to another station, for example, a ground station.

It is desirable to obtain complete knowledge of the remote receiver status during its demodulation operation so that the link environment disturbances, the receiver tracking performance, and the data detection performance can be understood and quantified. If the repeater station receiver were located in a laboratory, direct measurements could be made to determine, e.g., of such parameters as the incoming signal amplitude, the RMS noise variation and the noise power in the received signal. For many remote relay receivers it is not possible to perform such direct measurements.

It is, therefore, an object of the present invention to provide a means for determining remote communication link quality and receiver performance.

Another object of the invention is to provide a measurable data set of parameters which can be transformed into the derived data set which characterizes the communications link quality and dynamic receiver performance.

Yet another object of the invention is to provide a set of digital processor algorithms adapted to transform the measured data set into the derived data set.

SUMMARY OF THE INVENTION

The present invention comprises an apparatus and method for determining communications link quality and dynamic receiver performance. The apparatus comprises means for measuring a receiver measurement data set at the output of the tracking and detection filter of the communications receiver, and a digital processor adapted to process the measurable data to determine a derived data set indicative of the communications link quality and dynamic receiver performance. The derived data set comprises the signal amplitude of the signal incident to the receiver, the RMS noise level of the input signal, and the carrier power to noise power density, which defines the link quality. The derived data further comprise the average phase tracking error of the receiver phase lock loop and the 1-sigma phase jitter or random phase tracking error, which parameters characterize the dynamic tracking performance of the receiver.

The novel measurable data set comprises estimates of the input signal amplitude and noise level, the average receiver phase error and RMS phase error. Five novel algorithms are employed by the digital processor of the receiver to derive the desired data set. The derived data set may then be utilized for real or non-real time applications.

The novel algorithms are cooperatively employed by the digital processor to determine the derived data set. The first algorithm determines the input signal amplitude based upon estimates of the signal amplitude and noise level. The second algorithm determines the noise level of the incident signal spectrum, based on the measured estimate of the noise level. The third algorithm determines the input signal power to noise power density, based on the estimates of the signal amplitude and noise level. The fourth algorithm determines the phase lock loop phase bias, based upon the estimate of the average phase error and the calculated value of the signal power to noise power density. The fifth algorithm is adapted to determine the 1-sigma phase jitter of the phase locked loop of the receiver, based on the estimate of the RMS phase error and the derived values for the signal power to noise power density and phase bias.

Other features and improvements are disclosed.

BRIEF DESCRIPTION OF THE DRAWINGS

The various objects, features and advantages of the disclosed invention will be readily appreciated by those skilled in the art from the following detailed disclosure when read in conjunction with the drawings, wherein:

FIG. 1 is a block diagram of a remote receiver.

FIG. 2 is a signal flow chart illustrating the derived data set X.

FIG. 3 is a chart indicating the data reduction scheme of the preferred embodiment.

DETAILED DESCRIPTION OF THE PREFERRED EMBODIMENT

Figure 4:
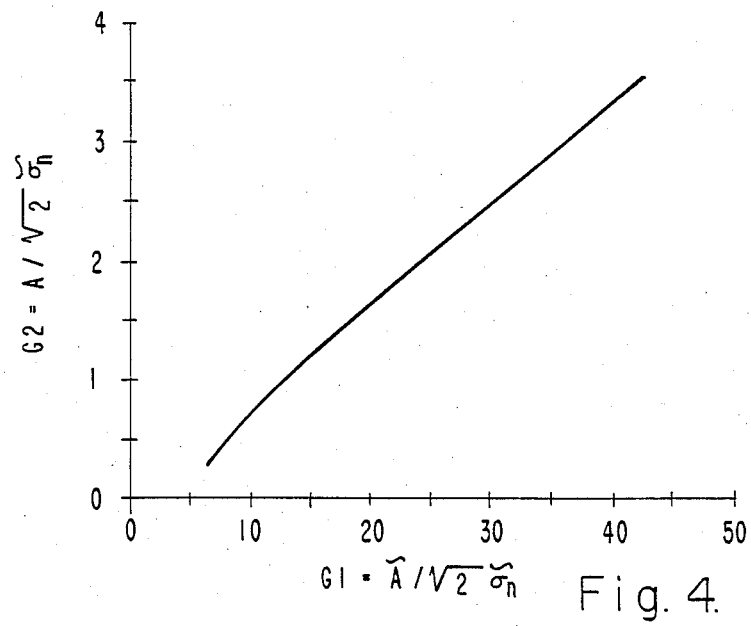
FIG. 4 is a graph plotting the functions G1 and G2 employed in Algorithm 1 of the preferred embodiment.

The present invention comprises a novel method and apparatus for determining communication link quality and receiver tracking performance. The following description of the invention is provided to enable any person skilled in the art to make and use the invention. Various modifications to the disclosed embodiment will be readily apparent to those skilled in the art, and the generic principles defined herein may be applied to other embodiments. Thus, the invention is not intended to be limited to the embodiment shown, but is to be accorded the widest scope consistent with the principles and novel features of the invention.

The disclosed embodiment is directed to a communications link employing a remote receiver/transmitter station 1 adapted to receive and demodulate a binary phased shift keyed (BPSK) information-bearing signal at receiver 2, and to transmit via transmitter 3 the recovered information to another receiver device. In particular, the disclosed embodiment is employed with a space vehicle having a deployable probe 4 for planetary exploration missions. The probe 4 is adapted to modulate and transmit information for reception and coherent detection by a receiver on the space vehicle. The demodulated information is in turn transmitted back to ground stations such as station 5.

The application for which the disclosed embodiment is utilized is hereafter referred to as the "present application." The invention has utility for other applications, as will be apparent to those skilled in the art, and it will be understood that, as used in this application, the term "receiver" is intended to refer to a receiver whose performance and related communications link parameters are to be determined in accordance with the invention.

The present invention comprises a technique for mapping, transforming or correlating information measured at the receiver to quantitative criteria indicative of the signal quality and receiver tracking performance. In the present application, these quantitative criteria are processed in the receiver processor, and the resultant data are transmitted to a ground station via a telemetry channel.

It is noted that the receiver for the present application is adapted to acquire and track a signal which is subject to severe signal perturbations. The receiver is described in my pending applications entitled: Receiver Mode Control for Acquiring and Tracking a Signal, Ser. No. 549,696; A Data Communications Receiver Operable In Highly Stressed Environment, Ser. No. 549,701; and Method and Apparatus for Acquiring and Tracking a Communications Signal, Ser. No. 549,536, filed on Nov. 7, 1983. These applications are incorporated herein by this reference.

While the above-referenced applications may be referred to for further details, in general the receiver employs matched detection of the binary phase shift keyed (BPSK) modulated signal, using a discrete Fourier transform (DFT) filter bank. After the presence of a signal is detected, and its approximate frequency determined, the receiver employs a frequency lock loop (FLL) and data symbol lock loop (SLL) to track the frequency and symbol timing of the signal. The receiver operation then shifts to a phase lock loop (PLL) coherent detection mode, in which valid data demodulation is assumed to occur after confirmation of phase lock.

The receiver operation is shown in the block diagram of FIG. 1, which illustrates the PLL operation of the analytic model of the receiver 2.

The matched filter bank is formed in the digital processor section 10 of the receiver, the input I.F. signal 15 having been heterodyned in mixer 20 with a numerically controlled oscillator 25 (NCO) signal, quadrature mixed to baseband and passed through a 2 Khz tracking filter and then digitized for processing by the digital receiver processor 10. The tracking filter and digitizer are shown generally as block 30.

The digital processor, indicated generally by phantom line 10 in FIG. 1, forms a DFT filter bank to cover the 2 Khz tracking filter bandwidth. Discrete Fourier Transform (DFT) filters C1, C2, C3 each have nominal 512 Hz bandwidth, and are respectively centered at 512 Hz, 1024 Hz and 1536 Hz in the 2 Khz bandwidth of the I.F. tracking filter. The tracking filter bandwidth is nominally centered on the frequency of the received carrier signal.

During the receiver FLL operation mode, the matched detection filter comprises DFT filter C2. During PLL operation, a DFT filter C4 is formed in the processor, having a 256 Hz bandwidth nominally centered at 1024 Hz, i.e., the center of the I.F. tracking filter bandwidth which is centered on the carrier frequency. The DFT filter bank is illustrated by block 35 in FIG. 1.

Still referring to FIG. 1 the input I.F. signal is mixed with the NCO signal, with the resultant difference signal being translated to baseband and then digitized. The resulting digital signal is provided to the DFT filter bank of the receiver. The output of the matched detection filter is coupled to the data detector 40, and also to the PLL phase discriminant 45 for determining an estimate $\hat{\phi}$ of the phase error. The discriminant $\hat{\phi}$ is filtered by the PLL loop filter 50, whose output drives the NCO.

Receiver Status Data Set

To understand and quantify the link environment disturbances, the receiver phase lock loop tracking performance and the data detection performance of the receiver, knowledge of the receiver status during the demodulation is required. This receiver status may be defined by a data set which is sufficient to provide observability of the link environment and phase tracking characteristics that impact the data demodulation and detection performances. This status data set consists of a set of characteristics which define the quality of: (1) the input signal driving the PLL, the symbol lock loop (SLL) and signal detection filter, and (2) the PLL tracking. For the present application, this data set comprises the following receiver status data set X.

Receiver Status Data Set $X = (A, \sigma_n, C/N_o, \bar{\phi}, \sigma_\phi)$

Input Signal (at output of DFT filters $C_2$, $C_4$)
  A = Signal amplitude
  $\sigma_n$ = 1-Sigma or RMS (root-mean-square) noise level
  $C/N_o$ = Carrier power to noise power density ratio PLL Tracking
  $\bar{\phi}$ = PLL phase bias or average phase tracking error
  $\sigma_\phi$ = 1-Sigma phase jitter or random phase tracking error of the PLL It is not possible to measure X(t) by any known direct measurement technique when the receiver is in an operational, remote environment and not in a laboratory with test equipment resources available to measure the input signal quality.

The present invention comprises an indirect measurement technique to calculate X(t) from an easily measured data set Y(t). The technique employs data reduction algorithms to uniquely define the functional relationship X = f(Y) which evaluates X as a function of Y. These algorithms, together with the measurement vector Y, represent a particular realization for the present application. A basic guideline is to measure the appropriate characteristics or vector components of Y so that the component of X can be derived with minimal computational complexity and with accuracy, within the constraint that the Y components must be easily measured or readily observable. For the application of the preferred embodiment, this data set consists of the following set Y.

Receiver Measurement Data Set $Y = (\tilde{A}, \tilde{\sigma}_n, \widetilde{\widetilde{\phi}}, \widetilde{\widetilde{\phi}}_{rms})$
DFT Filter Output
$\tilde{A}$ = Averaged amplitude of $C_4$
$\tilde{\sigma}_n$ = Averaged amplitudes of $C_1$ plus $C_3$
Phase Discriminant Output
$\widetilde{\widetilde{\phi}}$ = Averaged value of phase discriminant
$\widetilde{\widetilde{\phi}}_{rms}$ = Averaged value of phase discriminant amplitude The purpose and reference names which correspond to the symbolic representations of the parameters of the measured data set Y are given below:

| Measurement | Purpose | Reference Name |
|---|---|---|
| $\tilde{A}$ | Radio Science | Signal amplitude |
| $\tilde{\sigma}_n$ | Engineering Status | Noise level |
| $\widetilde{\widetilde{\phi}}$ | Engineering Status | Average phase error |
| $\widetilde{\widetilde{\phi}}_{rms}$ | Engineering Status | RMS phase error |

The radio science and engineering status measurements together comprise the receiver status measurements.

The receiver status measured data set Y is schematically illustrated in FIGS. 1 and 2. $\tilde{A}$ and $\tilde{\sigma}_n$ are measurements taken by measuring means 6 at the output of DFT filter bank 35, as illustrated by phantom line 37 in FIG. 1. Similarly, $\widetilde{\widetilde{\phi}}$ and $\widetilde{\widetilde{\phi}}_{rms}$ are measurements taken by means 6 at the output of the phase discriminant 45, as illustrated by phantom line 47 in FIG. 1.

FIG. 2 is a simplified signal flow diagram. The quality of input signal 15 is characterized by its signal amplitude (A), noise level ($\sigma_n$) and carrier-to-signal-noise-power ratio (C/N$_o$). The input signal is processed by the receiver to recover the data, and the receiver PLL tracking state is characterized by the PLL phase bias or average phase tracking error $\bar{\phi}$ and the 1-sigma phase jitter or random phase tracking error $\sigma_\phi$.

The input signal quality parameters A, $\sigma_n$, and C/N$_o$ are used to define the link quality, to assist in the calculation of the PLL tracking state, and to predict the detection performance. The signal amplitude A provides a measurement of the link attenuation time history. For this application, changes in A(t) are caused by scintillation induced signal fading along the propagation path and by path length changes. In particular, the record A(t) can be used to derive the fade characteristics.

The noise level $\sigma_n$ provides a time history of the input temperature seen by the receiver antenna, as well as any R.F.-to-digital noise disturbances. The C/N$_o$ data enables the calculation of the signal-to-noise ratio SNR = T C/N$_o$ = (C/N$_o$)/256 Hz, where T is the symbol length, seen at the output of the receiver tracking and detection filter $C_4$. When the PLL phase tracking quality is taken into account, this SNR enables the prediction of the signal detection quality expressed as the BER (bit-error-rate) of the decoded data. For the present application, the derived data is transmitted to an earth station 5 via a telemetry channel.

PLL phase tracking quality parameters $\bar{\phi}$ and $\sigma_\phi$ are needed to define the PLL tracking state, under the assumption that the receiver is operating in the valid data demodulation mode. The PLL phase bias or average phase offset $\bar{\phi}$(t) provides a time history of the loop stress due to changes in the frequency f and frequency rate df/dt of the tracked signal. When there is no loop stress, the phase bias vanishes ($\bar{\phi}$=0). For the present application, the variations in f and df/dt of the received signal are caused primarily by wind gusts, probe spin, and the probe dynamics.

The PLL 1-sigma phase jitter $\sigma_\phi$(t) provides a time history of the random component of the PLL tracking performance in response to noise conditions, loop stress, cycle slip, and the SLL impacts. Together with the known loop parameters and the C/N$_o$, these PLL characteristics define the PLL tracking quality and enable derivation of the aforementioned disturbances that drive the PLL parameters from their steady-state or unstressed values.

Real and non-real time uses exist for the receiver status data set X(t) which is illustrated in FIG. 1 as being fed to an on board utilization means 7 as well as to transmitter 3. Non-real time applications include (i) post-mission diagnostics for improvement of repetitive missions in which case means 7 comprises a recorder, (ii) improvement in data fidelity (corresponding to reduction of the data bit-error-rate) by optimizing the data demodulation for the time history of X(t), and (iii) provision of a diagnostic record of a hostile mission environment.

Real time applications for the data set X(t) potentially form the more important group of applications. One such application is to use X(t) to adaptively determine the receiver tracking discriminants, loop configuration and demodulation technique to improve communication performance under changed X(t) conditions. For example, as the X(t) deteriorates, the receiver can be switched from coherent demodulation to non-coherent demodulation. As another example, the stand-alone operation of the receiver can be switched to an aided configuration as X(t) degrades, with the aiding provided by inertial instrumentation data.

Another real time application of X(t) is to switch to a more robust set of receiver tracking parameters, data demodulation and decoder metrics to counter degradation in X(t). The X(t) may be used as a means to control the radiated power of the link through feedback control of the transmitter source, to limit the radiated spillover and thereby minimize interference and non-link detection. The X(t) may also be used to optimize data recovery by multi-pass tracking and demodulation. This could be extremely valuable when excess data processing capability exists to permit multi-pass operation.

FIG. 3 provides an operational overview of the interrelation of the five novel data reduction algorithms which are employed in the disclosed embodiment. The measured data set Y, comprising the estimates of the input signal amplitude, noise level, average phase error and RMS phase error provides the algorithm input data. Five algorithms (1-5) are employed to derive the data set X, comprising the signal amplitude, noise level, signal-power-to-noise-power density ratio, PLL phase bias and PLL 1-sigma jitter.

It is noted that the measurements $\tilde{A}$ and $\tilde{\sigma}_n$ taken at the output of the digital processor DFT filter bank provide the necessary input data for algorithms 1-3 which are employed to determine the signal amplitude A, the noise level $\sigma$n and the signal-power-to-noise-power density ratio C/N$_o$. The input data required by algorithm 4 to determine the PLL phase bias $\bar{\phi}$ consist of the average phase bias $\widetilde{\phi}$ and the derived value for C/N$_o$. The input data required by algorithm 5 to determine the PLL 1-sigma phase jitter consists of the measured RMS phase error $\widetilde{\phi}_{rms}$ and the calculated values for the PLL phase bias and the C/N$_o$.

The data set parameters are defined in Table I. Notationally, $|C_4|_i = |C_4|$ for the $i^{th}$ symbol in the DFT summation, $\phi$ is the phase discrimination output defined in Equation 1, and $<(0)>$ is the sample mean or sample average of the quantity (0), calculated by the Equation 2:

$$\phi = \frac{\eta_2 \cdot (\text{sign } I)Q}{<|C_2|>} \quad (1)$$

where $I$ = Real component of $C_4$ $Q$ = Imaginary component of $C_4$ $<|C_2|>$ = 1 second recursive average of the DFT filter $C_2$ amplitude $|C_2|$ $\eta_2$ is a PLL scaling constant $$<(O)> = \frac{1}{127} \sum_{i=1}^{127} (O)_i, \quad (2)$$

where $(O)_i$ is the $i^{th}$ symbol in the summation.

It is to be understood that the data set parameters of Table I are defined specifically in terms of the present application. Thus, for example, the averaging times for the measurements are determined by the data rate and other parameters of the present application. For other applications, of course, these averaging times, for example, may be varied.

TABLE I

Receiver Status: Measurements

| Measurement | Definition | Averaging Time |
|---|---|---|
| Signal amplitude | $\widetilde{A} = \sum_{i=1}^{12} |C_4|_i$ | 12 symbols = 1/21 sec. |
| Noise level | $\widetilde{\sigma}_n = 0.5 < |C_1| + |C_3| >$ | 2.3 sec. |
| Average phase error | $\widetilde{\phi} = <\phi>$ | 2/3 sec. |
| RMS | $\widetilde{\phi}_{rms} = <|\phi|>$ | 2/3 sec. |

Algorithm 1. Calculation of Signal Amplitude

Inband signal plus noise is measured by the DFT filter C$_4$ magnitude, $|C_4|$. For the present application, the possible low C/N$_o$ values preclude the use of $|C_4|$ as a direct estimate of the signal amplitude due to the inaccuracy caused by the noise content in the energy summed in DFT C$^4$. Restated in terms of the estimate $\widetilde{A}$ of the signal amplitude defined in Table I, the measurement $\widetilde{A}/12$ will be too strongly contaminated with noise at low SNR values to be used as a direct estimate of A. For large SNR values compared to unity, the noise contribution becomes less significant, whereupon $\widetilde{A}/12$ closely approximates A. For a valid estimate of the signal amplitude A throughout the wide range of SNR values ranging from low to high for the present application, an out-of-band noise estimate such as provided by $\widetilde{\sigma}_n$ defined in Table I is needed. This additional parameter $\widetilde{\sigma}_n$ allows the calculation and removal of the noise present in the measurement $\widetilde{A}/12$.

Algorithm 1, as well as Algorithms 2 and 3 described below, comprise relationships that use the following set of signal quality equations that relate the estimates $\widetilde{A}$, $\widetilde{\sigma}_n$ and the corresponding A, $\sigma_n$, C/N$_o$. These equations are derivable from direct application of the theory of random processes to the equations of definition in Table I.

| Signal Quality Equations | |
|---|---|
| $G1 = \widetilde{A}/\sqrt{2}\,\widetilde{\sigma}_n$ | : Definition (3.2) |
| $= 6\,e^{-SNR/2}((1+SNR)\,I_0(SNR/2) + SNR\,I_1(SNR/2))$ | : Derivation (3.2) |
| $G2 = \sqrt{SNR}/\sqrt{\pi}$ | : Definition (3.3) |
| $\widetilde{\sigma}_n \sqrt{\pi}\,\sigma_n$ | : Derivation (3.4) |
| $A = \sqrt{2} \cdot \widetilde{\sigma}_n \cdot G2$ | : Derivation (3.5) |
| $C/N_o = 256\,SNR$ | : Derivation (3.6) |
| where | |
| $SNR = T\,C/N_o = A^2/2\,\sigma_n^2$ : for $C_4$ | |
| $I_0$ = Modified Bessel function of order zero | |
| $I_1$ = Modified Bessel function of order one | |

The derivation for the function G1 (Equation 3.2) is found to within a multiplicative factor in the book "Probability, Random Variables, and Stochastic Processes," by A. Papoulis, McGraw-Hill Book Company, at page 499 (1965 Edition).

Algorithm 1 calculates the signal amplitude A from the measurements $\widetilde{A}$ and $\widetilde{\sigma}_n$, and is defined in equation form by the steps set forth in Table II.

TABLE II

Algorithm 1. Calculate A

| Step | Calculate | Method |
|---|---|---|
| 1 | G1 | $G1 = \widetilde{A}/\sqrt{2}\,\widetilde{\sigma}_n$ |
| 2 | SNR | Solve Equation 3.2 for SNR |
| 3 | G2 | $G2 = SNR/\sqrt{\pi}$ |
| 4 | A | $A = \sqrt{2}\,\widetilde{\sigma}_n\,G2$ |

In FIG. 4, the parameter G2 is plotted as a function of G1 for the preferred embodiment, i.e., combining steps 1, 2, 3, in Table II.

Algorithm 2. Calculate $\sigma_n$

It is particularly straightforward to calculate the $\sigma_n$ referenced to the DFT filter C$_4$ output, using the fundamental assumption that the receiver PLL is phase tracking correctly with few cycle slips and no average frequency offset from the center of detection filter C$_4$. This means that essentially no signal energy spills over into the adjacent DFT filters C$_1$ and C$_3$ whereupon the noise level measurement $\widetilde{\sigma}_n$ has an insignificant signal content. In turn, this observation enables derivation of Equation 3.4 that relates the $\sigma_n$ and $\widetilde{\sigma}_n$, and leads to the definition of Aglorithm 2 given by Equation 4.

$$\sigma_n = \tilde{\sigma}_n / \sqrt{\pi} \qquad (4)$$

Algorithm 3. Calculate $C/N_o$

The relationship in Equations 3.1–3.6 that define the $C/N_o$ at the output of DFT filter $C_4$ in terms of the SNR is the algorithm for calculating $C/N_o$, given by Equation 5.

$$C/N_o = 256\ SNR \qquad (5)$$

Figure 5:
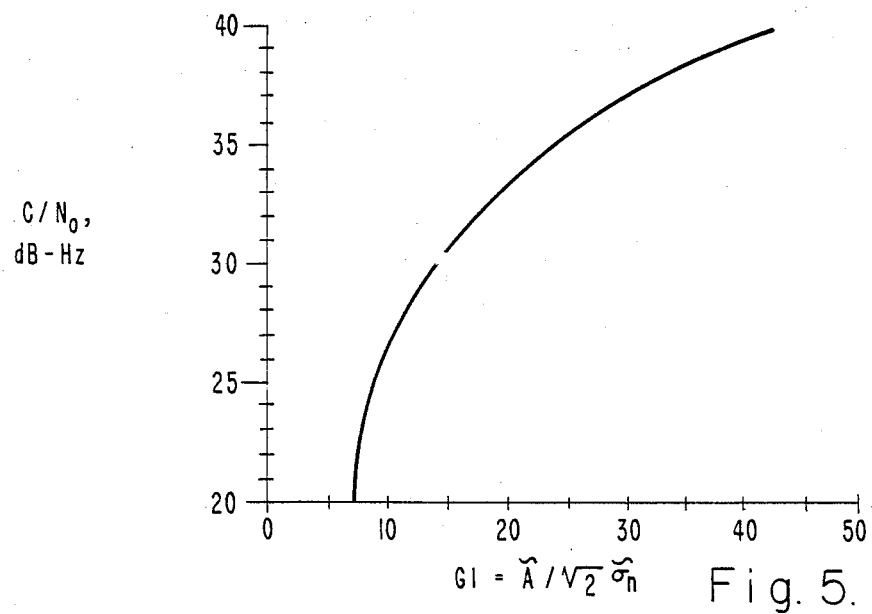
FIG. 5 is a graph plotting the carrier power-to-signal noise ratio $C/N_o$ as a function of G1 employed in Algorithm 3 of the preferred embodiment.

The SNR has been calculated in step 2 of Algorithm 1 in Table II. Algorithm 3 is defined graphically in FIG. 5 where step 1 of Algorithm 1 is combined with Equation 5. Equation 5 is defined in terms of the bandwidth of the detection filter $C_4$. $C/N_o$ can more generally be defined as the product of the bandwidth (in Hz) of the detection filter and the SNR.

FORTRAN Implementation of Algorithms 1, 2, 3

A data reduction computer program was written in the FORTRAN language to implement Algorithms 1, 2, 3. The program can be used to transform the receiver measurements $\tilde{A}, \tilde{\sigma}_n$ into the receiver status data $A, \sigma_n, C/N_o$. This FORTRAN program represents a realization of Algorithms 1, 2, 3 and is defined by the two subroutines set forth in Tables III and IV.

TABLE III

| Subroutine 1: Calculate G1, G2 vs. $C/N_o$, SNR and Store |  |
|---|---|
| DO 100 I = 1,2501 | |
| CNO=20. +0.01*FLOAT(I−1): | Calculate $C/N_o$ vs. index I |
| XCNO= 10. **(CNO/10.): | XCNO = $C/N_o$ |
| XSNR = XCNO/256: | XSNR = SNR |
| XNR2 = XSNR/2. | |
| XXX = XSNR2 | |
| CALL BESI (XXX,0,XIO,IERO) | |
| CALL BESI (XXX,1,XI1,IER1) | |
| XNORM = | |
| SQRT(PI/2.)*EXP(−XXX)*((1.+XSNR)*XIO+XSNR*XI1) | |
| G1=6. *XNORM/SQRT(PI/2.): | PI = $\pi$ |
| GG = 1.77245/SQRT(XSNR) | |
| G2 = 1./GG | |
| G2MAT(I) = G2: | Store G2 vs. index I |
| G1MAT(I) = G1: | Store G1 vs. index I |
| 100 CONTINUE | |
| RETURN | |
| END | |

TABLE IV

| Subroutine 2: Calculate $A, \sigma_n, C/N_o$ vs. $\tilde{A}, \tilde{\sigma}_\eta$ |  |
|---|---|
| RAT = AMEAS/(RNOS*SQRT(2.)) | :RAT = $\tilde{A}/\sqrt{2\tilde{\sigma}_n}$ |
| DO 300 I=1, 2501 | :AMEAS = $\tilde{A}$ |
| IF(G1MAT(I) · GE. RAT) | :RNOS = $\tilde{\sigma}_n$; |
| GO TO 310 | |
| 300 CONTINUE | :Find G1 = $\tilde{A}/\sqrt{2}\ \tilde{\sigma}_n$ |
| 310 CONTINUE | |
| CNOEST = 20.+0.01*FLOAT(I−1) | :CNOEST = $C/N_o$ |
| RNOEST = RNOS/SQRT(2.*PI) | :RNOEST = $\sigma_n$ |
| 410 AMPEST = G2MAT(I) * RNOS*SQRT(2.) | :AMPEST = A |
| RETURN | |
| END | |

Algorithm 4. Calculate $\phi$

Figure 6:
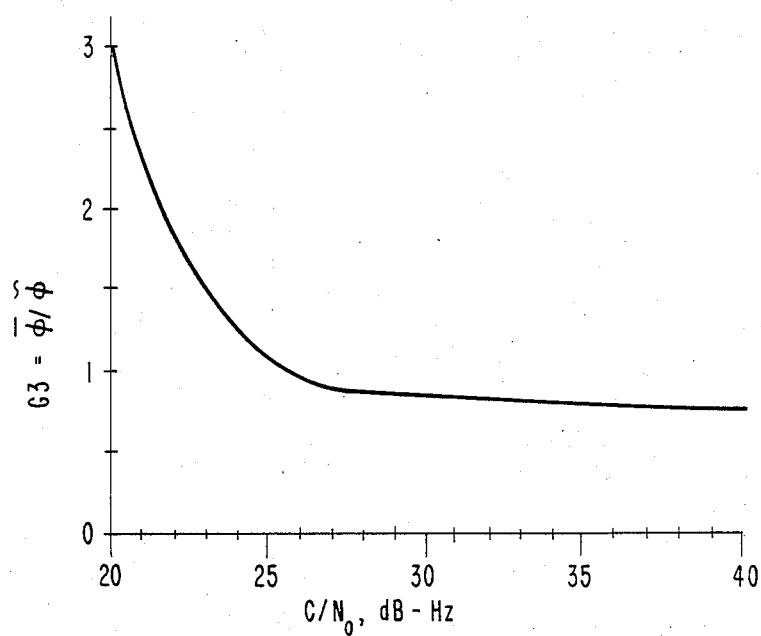
FIG. 6 is a graph plotting the function G3 as a function of $C/N_o$, as employed in Algorithm 4 of the preferred embodiment.

As will be shown in the following developments, the average PLL phase error $\overline{\phi}$ is proportional to the measurement $\tilde{\phi}$ made at the PLL discriminant output, with the constant of proportionality G3 solely dependent on $C/N_o$. Starting with the definition of the $\overline{\phi}$ in Equation 1 and $\tilde{\phi}$ in Table I, the following set of equations which together define G3 as a function of $C/N_o$ are derived.

$$\phi = \langle \hat{\phi} \rangle \qquad \text{Definition in Table} \qquad (6.1)$$

$$= \left(\frac{E(\hat{\phi})}{\phi}\right)\phi \qquad \text{Derivation which is valid for } |\phi| \ll 1 \qquad (6.2)$$

$$= \tilde{\phi}/G3 \qquad \text{Definition} \qquad (6.3)$$

$$1/G3 = E(\hat{\phi})/\phi \qquad \text{Definition} \qquad (6.4)$$

$$= E\left(\eta_2 \frac{(\text{sign } I)Q}{\langle |C_2| \rangle}\right)\frac{1}{\phi} \qquad \text{From Equation (2)} \qquad (6.5)$$

$$= \eta_A \eta_\phi \qquad \text{Definition} \qquad (6.6)$$

$$1/\eta_A = \frac{E(\langle |C_2| \rangle)}{\eta_{2,A}} \qquad \text{Definition} \qquad (6.7)$$

$$= \frac{1}{12\eta_{2,A}} \sqrt{\frac{\pi}{SNR}}\ G1 \qquad \text{Derivation} \qquad (6.8)$$

$$\eta_\phi = \eta_{2,\phi} \frac{E((\text{sign } I)Q)}{\phi} \qquad \text{Definition which is valid for } |\phi| \ll 1 \qquad (6.9)$$

$$= \eta_{2,\phi}(1 - 2\ BER) \qquad \text{Derivation} \qquad (6.10)$$

$$BER(SNR) = 0.5 - 0.5\ ERF(\sqrt{SNR}) \qquad \text{Derivation} \qquad (6.11)$$

$$ERF(\sqrt{SNR}) = \frac{2}{\sqrt{\pi}} \int_0^{\sqrt{SNR}} e^{-x^2} dx \quad \text{Definition} \quad (6.12)$$

$$\eta_2 = \eta_{2,A}\eta_{2,\phi} = \text{Scaling constants which are} \quad (6.13)$$
selected so that $\eta_A = 1$ and $\eta_\phi = 1$
at the design point value of
$C/N_o$ which for this application
is $C/N_o = 25$ dB-Hz The proportionality factor G3 is plotted as a function of $C/N_o$ in FIG. 6, with the scaling constants selected for the design point value of $C/N_o$ equal to 25 db-hz, in accordance with equation 6.13.

Equations 6.1–6.13, together with Algorithm 3, enable the formulation of Algorithm 4 as the three step procedure given in Table V.

TABLE V

Algorithm 4. Calculate $\bar{\phi}$

| Step | Calculate | Method |
|---|---|---|
| 1 | $C/N_o$ | Use Algorithm 3 |
| 2 | G3 | Solve equation set 6 for G3 vs. $C/N_o$ |
| 3 | $\bar{\phi}$ | $\bar{\phi} = \hat{\phi}$ G3 |

Algorithm 5. Calculate $\sigma_\phi$

To construct the algorithm for calculating the PLL loop jitter $\sigma_{100}$, the starting point is the fundamental equation which relates $\sigma_\phi$ to the 1-sigma phase jitter $\sigma_{\tilde{\phi}}$ from the phase discriminant driving the PLL, PLL one-sided noise bandwidth $B_L$, and the discriminant gain change $\eta_\phi$ between the signal and noise inputs to the loop. Starting with the loop equations and using the basic assumptions that $B_L T << 1$, $|\tilde{\phi}| << 1$, the relationship for $\sigma_\phi$ as a function of $\sigma_{\tilde{\phi}}$ is given by Equation 7.

$$\sigma_\phi = \sqrt{2B_L T}\sigma_{100}/\eta_\phi \quad (7)$$

As used in Equation 7, the symbol length T for the present application is T=1/256 Hz, and the $\eta_\phi$ is defined by equation set 6.1–6.13.

The loop bandwidth set for the design point value of $C/N_o$ will change with $C/N_o$ due to the change in the phase discriminant gain $\eta_A \eta_\phi = 1/G3$ defined in equation set 6.1–6.13. For the present application, the performance parameters $\xi_1$, $\xi_2$, $B_L$, are selected at the design point $C/N_o$ and this defines the processor parameters G, A, B that implement the PLL as depicted in FIG. 1. (The symbol A has the dual usage of representing the signal amplitude as well as a loop filter time constant). The notation $\bar{X}$ is used to differentiate the design point value from the current value X. This allows $B_L$ to be defined in terms of the design point values $\bar{\xi}_1, \bar{\xi}_2, \bar{B}_L$ and the loop gain change 1/G3 by the following set of equations.

$\xi_1, \xi_2, B_L$ = Design point values of $\xi_1, \xi_2, B_L$ $1/G3$ = Change in the PLL loop gain from the design point value $$Z_1 = 1 + 2\xi_1\xi_2 \quad (8.1)$$

$$Z_2 = \xi_1 + 2\xi_2 \quad (8.2)$$

$$\omega_n = 4\bar{B}_L \frac{(Z_1 Z_2 - \xi_1)}{((Z_1 Z_2 - \xi_1)Z_2 + Z_1^2)} \quad (8.3)$$

$$G = \omega_n Z_2 \quad (8.4)$$

$$A = \omega_n Z_1/Z_2 \quad (8.5)$$

$$B = \omega_n^2 \xi_1/Z_2 \quad (8.6)$$

$$G = G/G3 \quad (8.7)$$

$$A = A \quad (8.8)$$

$$B = B \quad (8.9)$$

$$B_L = \frac{G}{4} \cdot \frac{(G \cdot A + A^2 - B)}{(G \cdot A - B)} \quad (8.10)$$

In these equations (8), the impact of the delay $e^{-sT}$ which is inherent in the PLL (and is shown in phantom in FIG. 1) has been neglected. For the present application, the accuracy desired in the calculation of $B_L$ did not require that the effect of the delay be included, which would make the calculation of $B_L$ more involved.

It is noted that Equation 8.10 is a standard relationship for the loop bandwidth, for example, found in the book "Principles of Coherent Communication," by A. J. Viterbi, McGrawHill Book Company, at Page 36 (1966 Edition). The phase discriminant jitter $\sigma_{\tilde{\phi}}$ can be related to the measurement $\tilde{\phi}_{rms}$ of the absolute value of the phase discriminant jitter in a convenient manner through the introduction of the function G4 and parameter $\lambda$. The function G4 and $\lambda$ are defined in Equation Set 9.

| | | | |
|---|---|---|---|
| $1/G4$ = | $\tilde{\phi}_{rms}/\sigma_{\tilde{\phi}}$ | Definition | (9.1) |
| = | $\eta_A E((\text{sign } I) Q/A)\sigma_{\tilde{\phi}}$ | Definition | (9.2) |
| = | $\lambda ERF(\lambda/\sqrt{2}) + \sqrt{2/\pi} e^{-\lambda^2/2}$ | Derivation | (9.3) |
| $\lambda$ = | $\eta_A \tilde{\phi}/\sigma_{\tilde{\phi}}$ | Definition | (9.4) |

The error function ERF has been defined in equation set 7, and $\lambda$ can be related to the measurements $\tilde{\phi}, \tilde{\phi}_{rms}$ by the approximation given in equation set 10.

$$\lambda = \eta_A \phi/\sigma_{\hat{\phi}} \qquad \text{Definition in (9.4)} \qquad (10.1)$$

$$= \frac{\phi}{\eta_\phi \sigma_{\hat{\phi}}} \qquad \text{From Equation set 6} \qquad (10.2)$$

$$= \frac{\sqrt{2/\pi}}{\eta_\phi} \frac{\phi}{\phi_{rms}} \qquad \begin{array}{l}\text{From Equation 9.4 for} \\ \lambda << 1\end{array} \qquad (10.3)$$

$$\approx \phi/\phi_{rms} \qquad \text{Approximation} \qquad (10.4)$$

The approximations of Equation Set 10 are used to initialize the interactive technique for finding the value of G4 in Algorithm 5. The algorithm is illustrated by the flow chart given in FIGS. 7A and 7B.

Algorithm 5 comprises the following basic steps. The first step is to calculate the value for the PLL discriminant scale factor $n_\phi = (1-2BER)/(1-2BER_O)$, where $BER_O$ is the BER at the design point value for $C/N_o$. $\eta_\phi$ is calculated by solving equation set 6.

The second step is to calculate the value for the PLL 1-sigma phase jitter $\sigma_{\hat{\phi}}$ from the equation sets 9 and 10. The third step is to calculate the value $B_L$ for the PLL loop bandwidth from the design point values of $B_L$, $\xi_1$, $\xi_2$ and the change in the $C/N_o$ from the design point value, taking into account the inherent delay in the PLL. The final step is to calculate the 1-sigma jitter $\sigma_\phi$ of the PLL, using the results of the previous three steps and solving equation 7.

Figure 7A:
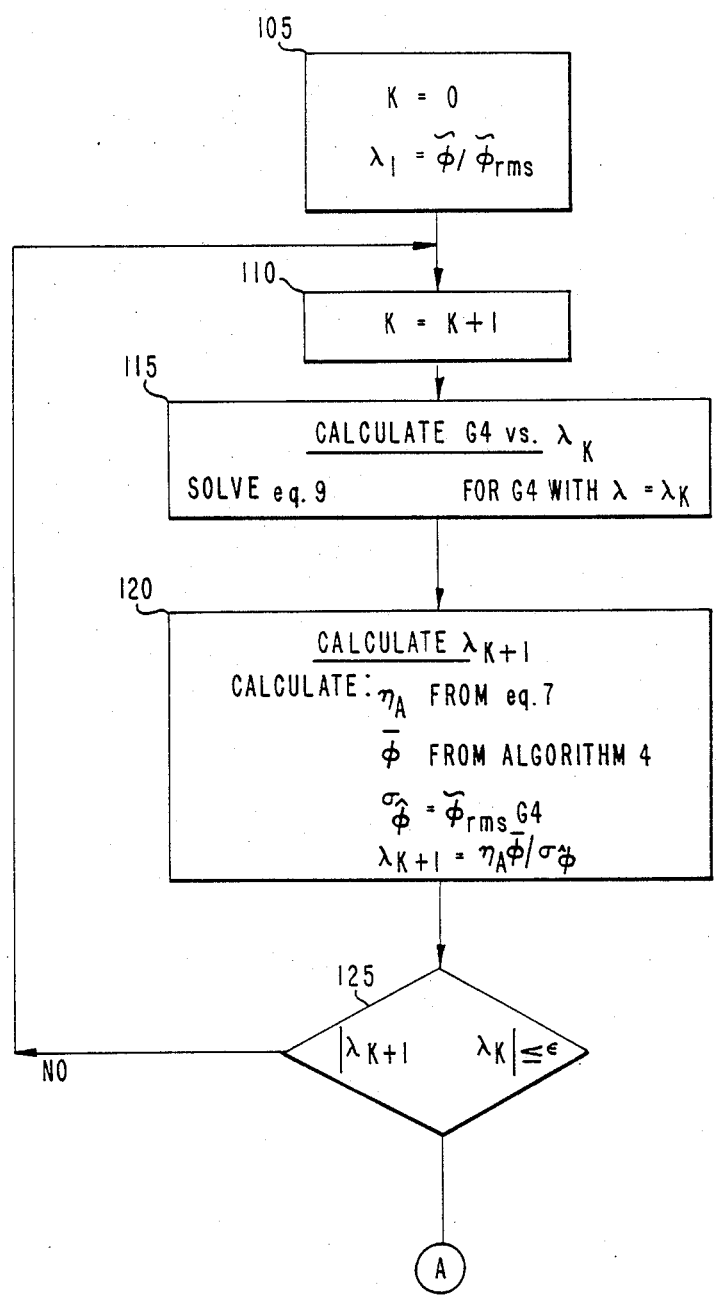
FIGS. 7A and 7B show a flowchart illustrative of Algorithm 5 of the preferred embodiment.

Referring now to FIG. 7A, algorithm 5 is illustrated in flowchart form. At step 105, the algorithm parameters K, $\lambda_1$ are initialized. At step 110, K is incremented. Step 115 comprises the first substantive step of the iterative sequence, the calculation of the function G4 versus $\lambda_K$. This step comprises the solution of equation set 9 for G4 with $\lambda = \lambda_K$. At step 120, the second step in the iterative sequence, the value for $\lambda_{K+1}$ is calculated. This step comprises the calculation of $\eta_A$ from equation 7 and $\phi$ from algorithm 4. From equations 9.1 and 9.4 $\sigma_{\hat{\phi}}$ and $\lambda_{K+1}$ may be calculated.

Figure 7B:
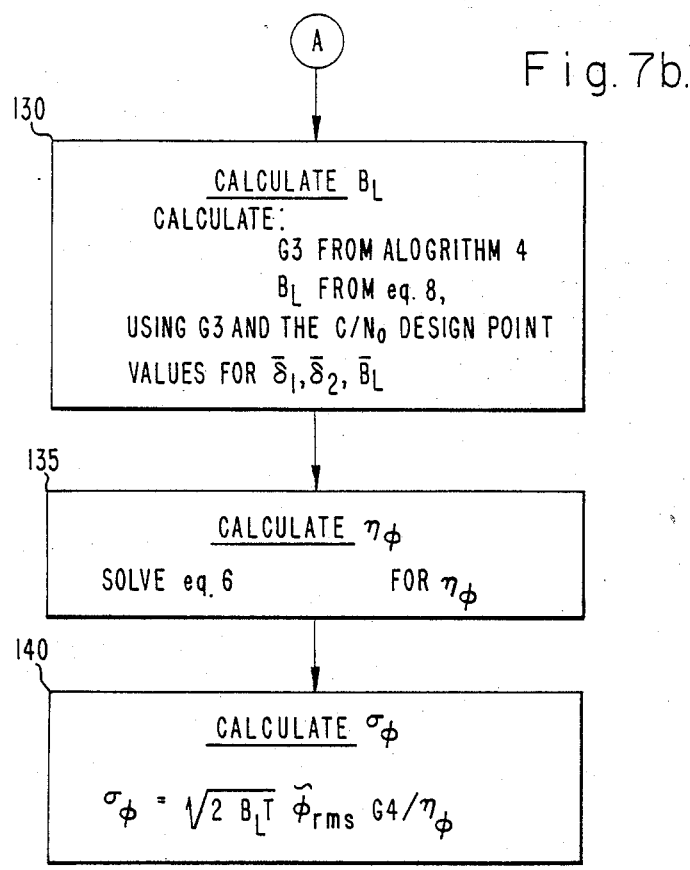

Step 125 comprises a convergence test to test whether the iterative value for $\lambda$ has converged to within a fixed value $\epsilon << 1$. If not, the iterative sequence is repeated. If convergence is detected, proceed to step 130 (FIG. 7B).

At step 130, the PLL bandwidth $B_L$ is calculated from equation set 8, using the $C/N_o$ design point values for $\xi_1$, $\xi_2$, and $\overline{B}_L$. At step 135, the value for the $\sigma_{\hat{\phi}}$ is calculated by solution of equation set 6. At step 140, the value for the PLL loop jitter $\sigma_\phi$ is calculated from the illustrated relationship, equation 7.

Figure 8:
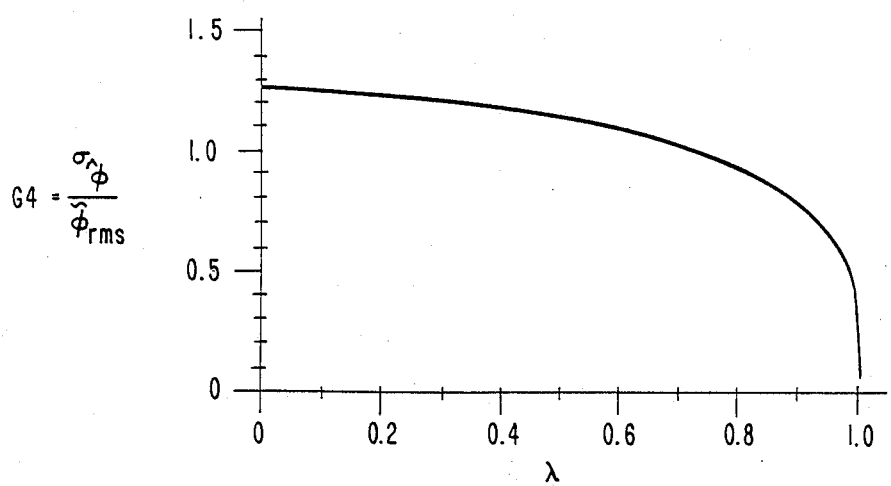
FIG. 8 is a graph plotting the function G4 against the function $\lambda$ for the present application.

In an alternative implementation of algorithm 5, the values for G4 as a function of $\lambda$ are predetermined and stored in memory. Thus, the value for G4 may be determined by employing a "look-up" table or graph, such as shown in FIG. B, instead of by a real-time solution of equation set 9. FIG. 8 is a graph plotting G4 as a function of $\lambda$ for the present application.

An important observation from the G4 curve in FIG. 8 is that G4 weakly depends on $\lambda$ for the small values $\lambda << 1$ which are expected under stable PLL tracking conditions. This suggests for many applications that the desired accuracy in the calculation of $\sigma_\phi$ could warrant deleting the iteration procedure (steps 110, 115, 120, 125 of FIG. 7A) and simply using the approximate value for $\lambda$ which initiates Algorithm 5.

FORTRAN Implementation of Algorithms 4, 5

In addition to subroutines 1, 2 listed in Table IV, a third subroutine was written in FORTRAN to implement algorithms 4 and 5. This FORTRAN program represents a realization of Algorithms 4 and 5 and is defined by the listing given in Table VI.

TABLE VI

Subroutine 3: Calculate $\phi$ and $\sigma_{\hat{\phi}}$

```
C FIRST, COMPUTE THE ALPHA AND ETA
   CORRESPONDING TO 25
   DB — HZ
C                          : ALPHA = η_A η_φ = 1/G3
                           : ETA = η_φ
   CNO = 25.
   XCNO = 10.**(CNO/10.)   : XCNO = C/N_o
   XSNR2 = XSNR/2.         : XSNR = SNR
   XXX = XSNR2
   CALL BESI (XXX,0,XI0,IER0)
   CALL BESI (XXX,1,XI1,IER1)
   XNORM = SQRT(PI/2.)*EXP(-XXX)*((1.+XSNR)
           *XI0+XSNR*XI1)
   XNORM = XNORM/SQRT(2.*XSNR)
   ETAC = 1./XNORM
   BER = 0.5 -0.5*ERF(SQRT(XSNR))
   ETA25 = 1. -2.*BER      :ETA25=η_φ for η_{2,φ}=1,
                            C/N_o=25 db-Hz
   ALPH25 = ETAC*ETA25     :ALPH25=η_A η_φ for η_2 1,
                            C/N_o=25 db-Hz
C
C NOW, COMPUTE ALPHA, AND ETA CORRESPONDING
   TO CURRENT C/NO
C
   CNO = CM                : Current C/N_o
   XCNO = 10.**(CNO/10.)
   XSNR = XCNO/256.
   XSNR2 = XSNR/2.
   XXX = XSNR2
   CALL BESI (XXX,0,XI0,IER0)
   CALL BESI (XXX,1,XI1,IER1)
   XNORM = SQRT(PI/2.)*EXP(-XXX)*((1.+XSNR)
           *XI0+XSNR*XI1)
   XNORM = XNORM/SQRT (2.*XSNR)
   ETAC = 1./XNORM
   BER = 0.5 -0.5*ERF(SQRT(XSNR))
   ETAA = 1.-2.*BER
   ETAA = ETAA/ETA25 : ETAA = η_φ,
                ALPHA = η_A η_φ = 1/G3
   ALPHA = ETAC*ETAA/ALPHA25
   ALPHAI = 1./ALPHA : ALPHAI = 1/(η_A η_φ — G3)
C NOW, COMPUTE THE AVERAGE PLL PHASE ERROR
   AVEPHA = AVEMEA * ALPHAI  : φ = φ̂ G3
                              AVEPHA = φ
                              AVEMEA = φ̂
                              ALPHAI = G3
C NEXT, COMPUTE THE CURRENT PLL NOISE
   BANDWIDTH
   ZETA1 = 0.5
   ZETA2 = 1.5
   Z1 = 1.+2.*ZETA1*ZETA2
   Z2 = ZETA1 + 2.*ZETA2
   XN = Z1*Z2*+Z1*Z1-ZETA1*Z2
   XD = Z1*Z2 — ZETA1
   WN = BL * 4. *XD/XN
   GI = Z2*WN
   AI = Z1*WN/Z2
   BI = ZETA1*WN*WN/Z2
   G = GI*ALPHA
   A = AI
   B = BI
   XBL = .25 *G*(G*A+A*A—B)/(G*A—B) : XBL=B_L
C NEXT, COMPUTE G4
   PHSRAT = AVEMEA/RMSMEA   : PHSRAT = λ
   XM1 = PHSRAT*ERF(0.707*PHSRA)  AVEMEA =
                              φ̂,RMSMEA=φ̂_{rms}
   XM2 = 0.79789*EXP(-0.5*PHSRAT*PHSRAT)
   XM = XM1 + XM2
   XMI = 1./XM              : XMI = G4
C NOW, COMPUTE THE 1-SIGMA PLL PHASE ERROR
```

TABLE VI-continued

Subroutine 3: Calculate $\bar{\phi}$ and $\sigma\bar{\phi}$

PLLDIS = SQRT(2.*XBL/256).)/ETTA  : PLLDIS = $\sqrt{2B_LT}$ /$\eta_\phi$

SIGPHS = PLLDIS*XMI*RMSMEA  : SIGPHS = $\sigma_\phi$

RETURN  = ($\sqrt{2B_LT}$ /$\eta_\phi$) G4 $\tilde{\phi}_{rms}$

END

It should be noted that the subroutine of Table VI implements the approximate or non-iterative version of Algorithm 5 corresponding to the use of the approximate value for λ to calculate G4. For the present application, this approximate method was considered to be sufficiently accurate.

Subroutine 3 together with subroutines 1 and 2 define the data reduction Algorithms 1,2,3,4 and 5 in a FORTRAN implementation that was used to transform the receiver measurements $Y=(\tilde{A}, \tilde{\sigma}_n, \tilde{\phi}, \tilde{\phi}_{rms})$ into the receiver status data set $X=(A, \sigma_n, C/N_o, \phi, \sigma_\phi)$, and represents an application of the novel data reduction $X=f(Y)$ technique of the present invention.

It is understood that the above-described embodiments are merely illustrative of the many possible specific embodiments which can represent principles of the present invention. For example, the invention can generally be utilized in conjunction with phase or frequency modulated receivers, which employ either coherent or non-coherent detection. The invention can be viewed as a technique for determining communication link quality of a link comprising a receiver. The link quality may then be considered as comprising the signal amplitude and noise level and density, which characterize the spectral qualities of the signal, as well as the parameters which define the receiver performance. Numerous and varied other arrangements can be readily devised in accordance with these principles by those skilled in the art without departing from the spirit and scope of the invention.

What is claimed is:

1. In a remote receiver/transmitter station for receiving a communication signal modulated with data from a first station, the remote station being adapted to demodulate the signal and retransmit it to a second station, the improvement wherein the remote station further comprises:
   measuring means for measuring a receiver measurement data set comprising readily measurable parameters selected from at least one of the following four parameters: a first parameter indicative of an estimate of the amplitude of said communication signal, a second parameter indicative of an estimate of the incident noise level, a third parameter indicative of the receiver average tracking phase error, and a fourth parameter indicative of the receiver RMS phase error;
   digital processor means connected to the measuring means for processing said receiver measurement data set into a derived data set including at least one data value selected from the following five data values: a first data value indicative of the signal amplitude of said communication signal, a second data value indicative of the received noise power level, a third data value indicative of the signal carrier to noise power density, a fourth data value indicative of the tracking performance of the receiver, and a fifth data value indicative of the random phase tracking error of the receiver; and
   means for transmitting the demodulated signal and said derived data set to said second station whereby the second station can obtain information about the communication link quality and receiver performance in addition to the communication signal.

2. The apparatus of claim 1 wherein said at least one selected data value for said derived data set includes said first data value indicative of the signal amplitude of said communications signal.

3. The apparatus of claim 2 wherein said at least one parameter for said measurement set includes said first parameter indicative of an estimate of said signal amplitude and said second parameter indicative of an estimate of the incident noise level.

4. The apparatus of claim 3 wherein said processor means is adapted to determine said first data value in dependence on said first and second parameters.

5. The apparatus of claim 4 wherein said at least one data value for said derived data set further includes said second data value indicative of the received noise power level.

6. The apparatus of claim 5 wherein said second data value is indicative of the root-mean-square (RMS) noise level.

7. The apparatus of claim 6 wherein said receiver comprises a bandpass filter means covering a frequency range outside the received carrier frequency range, and said measurement means is adapted to measure the average spectral energy detected in said filter means and generate a signal indicative of the out-of-band noise level.

8. The apparatus of claim 5 wherein said at least one data value for said derived data set includes said third data value indicative of the signal carrier to noise power density.

9. The apparatus of claim 8 wherein said receiver comprises a detection filter centered at the carrier frequency and having a bandwidth B, and wherein said processor means is adapted to determine the signal to noise ratio (SNR) of the incident signal.

10. The apparatus of claim 8 wherein said at least one data value for said derived data set further includes said fourth data value indicative of the tracking performance of the receiver.

11. The apparatus of claim 10 wherein said receiver is adapted to operate in a phase locked loop (PLL) mode, and said fourth data value comprises the average PLL phase error.

12. The apparatus of claim 11 wherein said at least one parameter for said measurement data set further includes said third parameter indicative of the receiver average tracking phase error.

13. The apparatus of claim 12 wherein said processor means is adapted to determine the average tracking error based upon the calculated value for the carrier to noise power density and the measured value indicative of the average receiver tracking phase error.

14. The apparatus of claim 10 wherein said at least one data value for said derived data set includes said fifth data value indicative of the random phase tracking error of the receiver.

15. The apparatus of claim 14 wherein said at least one parameter for said measured data set includes said fourth parameter indicative of the receiver RMS phase error.

16. The apparatus of claim 15 wherein said processor means is adapted to calculate the fifth data value indicative of receiver random phase tracking error, based upon said fourth parameter indicative of the receiver RMS phase error, said value for the signal power to noise power density and said value for the average receiver phase error.

17. A method for determining the quality of a communications link employing a communications signal and a remote communications receiver, comprising the steps of:
  (1) providing a measuring means in the remote receiver for measuring a receiver measurement data set comprising readily measurable parameters selected from at least one of the following four parameters: a first parameter indicative of an estimate of the amplitude of said communication signal, a second parameter indicative of an estimate of the out-of-band noise level, a third parameter indicative of the receiver average tracking phase error, and a fourth parameter indicative of the receiver RMS phase error;
  (2) instructing a digital processor means coupled to the measuring means to calculate, from said measurement data set, a derived data set indicative of the quality of said communications link including at least one data value selected from the following five data values: a first data value indicative of the signal amplitude of said communication signal, a second data value indicative of the received noise power level, a third data value indicative of the signal carrier to noise power density, a fourth data value indicative of the tracking performance of the receiver, and a fifth data value indicative of the random phase tracking error of the receiver; and
  (3) transmitting the derived data set together with a signal associated with the communications signal to a ground station whereby the ground station can obtain information about the communication link quality and receiver performance in addition to the communication signal.

18. The method of claim 17 wherein said at least one selected parameter for said measurement means includes said first and second parameters indicative of estimates of the amplitude of the communications signal and the out-of-band noise level to such receiver, and said digital processor means is adapted to carry out a first algorithm to calculate the first data value indicative of the amplitude of such communications signal in dependence upon said estimates of said amplitude and noise level.

19. The method of claim 18 wherein said first algorithm comprises the steps of:
  (a) calculate the value for the variable G1, where $G1 = \tilde{A}/\sqrt{2\tilde{\sigma}_n}$;
  (b) calculate the signal-to-noise ratio (SNR), from the relationship $G1 = 6e^{-SNR/2}((1+SNR)I_o(SNR/2) + SNR(SNR/2))$;
  (c) calculate the value for the variable G2, from the relationship $G2 = \sqrt{SNR}/\sqrt{\pi}$; and
  (d) calculate the amplitude A of the signal from the relationship $A = \sqrt{2\tilde{\sigma}_n} \cdot G2$;
where $I_o$ is the modified Bessel data value of order zero, I, is the modified Bessel data value of order one, and $\tilde{A}$ and $\tilde{\sigma}_n$ represent the respective estimates of the amplitude and out-of-band noise level.

20. The method of claim 19 wherein said digital processor is adapted to carry out a second algorithm to calculate the second data value indicative of the noise level $\sigma_n$.

21. The method of claim 20 wherein said digital processor is adapted to carry out a second algorithm to determine the noise level $\sigma_n$, said second algorithm comprising:

$$\sigma_n = \tilde{\sigma}_n/\pi.$$

22. The method of claim 21 wherein said digital processor is adapted to carry out a third algorithm to calculate the third data indicative of the carrier power-to-noise power density ratio $(C/N_o)$.

23. The method of claim 22 wherein said third algorithm comprises calculating $C/N_o$ based on the relationship $$C/N_o = (B)(SNR),$$

where B represents the bandwidth (Hz) of the receiver detection filter and SNR represents the signal-to-noise ratio.

24. The method of claim 22 wherein said receiver comprises a phase lock loop (PLL) and said digital processor is adapted to carry out a fourth algorithm adapted to compute the fourth data value indicative of the average phase tracking error $\bar{\phi}$ of the receiver.

25. The method of claim 24 wherein the receiver includes a phase lock loop (PLL), wherein said third parameter is indicative of the PLL phase discrimination output $\hat{\phi}$ and wherein said fourth algorithm comprises the steps of:
  (a) determining the average phase error $\tilde{\phi}$ at the PLL discrimination output;
  (b) setting $\bar{\phi}$ equivalent to $\tilde{\phi}/G3$, where G3 is a constant of proportionality dependent solely upon $C/N_o$;
  (c) determining G3 for the calculated value of $C/N_o$; and
  (d) determining the average phase error $\bar{\phi}$ from the determined values for the average phase error $\tilde{\phi}$ and proportionality constant G3.

26. The method of claim 25 wherein said digital processor means is adapted to carry out a fifth algorithm to calculate the fifth data value indicative of the random tracking error of the receiver $\sigma\phi$.

27. The method of claim 26 wherein said at least one parameter for said receiver measurement data set includes said fourth parameter $\hat{\phi}$ indicative of the receiver RMS phase error.

28. The method of claim 27 wherein said fifth algorithm comprises the steps of:
  (a) calculating the value for the PLL discriminant scale factor $\eta_\phi$;
  (b) determining the value for the PLL discriminant 1-sigma phase jitter $\sigma_{\hat{\phi}}$;
  (c) calculating the value for the one-sided PLL loop bandwidth $B_L$; and
  (d) solving the relationship $$\sigma_\phi = 2\sqrt{B_L T} \sigma_{\hat{\phi}}/\eta_\phi.$$

29. An improved communications link, comprising:
  a transmitted data signal modulated with data;
  a receiver dapated to receive and demodulate said signal to recover said data, said receiver including a discrete Fourier transform (DFT) filter bank and a phase lock loop (PLL) phase discriminant;

measuring means in said receiver and coupled to the DFT filter bank and PLL phase discriminant for measuring receiver parameters and providing a measurement data set indicative of characteristics of said transmitted signals;

digital processor means in the receiver and coupled to said measuring means and adapted to calculate a derived data set from said measurement data set to provide an indication of communication link and receiver performance; and utilization means adapted to utilize said derived data set.

30. The system of claim 29 wherein said utilization means and said receiver means are cooperatively arranged for adaptive adjustment of the receiver operation in response to said processor signals.

31. The invention of claim 29 wherein said processor means is further adapted to provide processor signals indicatiave of the receiver tracking performance.

32. The invention of claim 31 wherein said processor means, said utilization means and said receiver means are cooperatively arranged for adaptive adjustment of the receiver operation in response to said processor signals.

33. The invention of claim 32 wherein the receiver operation is adaptively switchable between coherent and non-coherent operation in dependence upon said processor signals.

34. The invention of claim 29 wherein said utilization means comprises recording means adapted to provide a diagnostic record of said processor signals.

* * * * *